(12) United States Patent
Lee et al.

(10) Patent No.: US 12,270,709 B2
(45) Date of Patent: Apr. 8, 2025

(54) INFRARED SENSOR

(71) Applicant: TXC CORPORATION, Taipei (TW)

(72) Inventors: Tzong-Sheng Lee, Ping Cheng (TW);
Jen-Wei Luo, Ping Cheng (TW);
Chia-Hao Weng, Ping Cheng (TW);
Chun-Chi Lin, Ping Cheng (TW);
Ting-Chun Hsu, Ping Cheng (TW);
Hui-Jou Yu, Ping Cheng (TW);
Yi-Hung Lin, Ping Cheng (TW);
Sung-Hung Lin, Ping Cheng (TW)

(73) Assignee: TXC CORPORATION, Taipei (TW)

( * ) Notice: Subject to any disclaimer, the term of this patent is extended or adjusted under 35 U.S.C. 154(b) by 687 days.

(21) Appl. No.: 17/329,366

(22) Filed: May 25, 2021

(65) Prior Publication Data

US 2022/0326085 A1 Oct. 13, 2022

(30) Foreign Application Priority Data

Apr. 7, 2021 (TW) .................................. 110203732

(51) Int. Cl.
*G01J 5/068* (2022.01)
(52) U.S. Cl.
CPC ..................................... *G01J 5/068* (2022.01)

(58) Field of Classification Search
None
See application file for complete search history.

(56) References Cited

U.S. PATENT DOCUMENTS

| | | | |
|---|---|---|---|
| 2005/0253283 A1* | 11/2005 | DCamp | H01L 23/26 257/787 |
| 2017/0068027 A1* | 3/2017 | Powell | B29C 41/20 |
| 2020/0103273 A1* | 4/2020 | Hirose | H01L 31/12 |

FOREIGN PATENT DOCUMENTS

| | | |
|---|---|---|
| TW | M478245 U | 5/2014 |
| TW | M490043 U | 11/2014 |
| TW | 201537721 A | 10/2015 |

* cited by examiner

*Primary Examiner* — Erica S Lin
(74) *Attorney, Agent, or Firm* — Birch, Stewart, Kolasch & Birch, LLP

(57) ABSTRACT

An infrared sensor uses an infrared lens with infrared filtering and focusing functions. Thus, an infrared filter can be omitted to reduce the costs and volume. In addition, a getter on the inside of a metal cover of the infrared sensor can be activated when the metal cover is soldered to the substrate of the infrared sensor. Therefore, the packaging process of the infrared sensor can be simplified.

10 Claims, 3 Drawing Sheets

INFRARED SENSOR

This application claims priority of Application No. 110203732 filed in Taiwan on 7 Apr. 2021 under 35 U.S.C. § 19; the entire contents of all of which are hereby incorporated by reference.

BACKGROUND OF THE INVENTION

Field of the Invention

The present invention relates to an infrared sensor, particularly to an infrared sensor integrated with an infrared lens.

DESCRIPTION OF THE RELATED ART

With the rapid development of the semiconductor industry and electronic technology, the manufacturing technology of infrared sensors is also improving day by day. Infrared sensors can be used not only in medicine to measure body temperature, but also in science, business and military, such as laser detection, missile guidance, infrared spectrometer, remote control, anti-theft device, thermal image detection, etc. Infrared sensors can be divided into thermal infrared sensors and photon infrared sensors. Since thermal infrared sensors are more convenient to use, they are also widely used in general applications. Presently, the thermal infrared sensor senses infrared light to generate sensing pictures with infrared sensing chips. A vacuum chamber is used to improve the sensitivity of the infrared sensing chip. The vacuum chamber accommodates a getter for maintaining the vacuum pressure of the vacuum chamber for a long time, thereby increasing the service life of the infrared sensor.

The conventional thermal infrared sensor at least includes an infrared sensing chip, a vacuum chamber, an infrared filter, a getter, and a lens. The infrared sensing chip is arranged in the vacuum chamber and used to sense infrared light to generate sensing pictures. The infrared filter can filter out any light other than infrared light. In order to avoid reflecting infrared light and degrading the quality of the pictures, the infrared filter can be coated or plated with an anti-reflection layer. The vacuum chamber can be used to improve the sensitivity of the infrared sensing chip. The vacuum chamber accommodates the getter for maintaining the vacuum pressure of the vacuum chamber for a long time, thereby increasing the service life of the infrared sensor. The lens can focus infrared light to the infrared sensing chip to generate clear pictures.

However, the getter of the infrared sensor needs to be activated. Since the activation temperature of the getter exceeds 300° C., the infrared sensor requires a special machine to perform the activation procedure of the getter in order to prevent the infrared sensing chip and the anti-reflection layer of the infrared filter from being damaged by high temperature. In order to form the vacuum chamber, the infrared sensor needs a pipe for extracting air. As a result, the conventional infrared sensor has higher package cost and more complicated package procedures. Besides, the conventional infrared sensor needs an infrared filter and a lens, which increases the cost and volume of the infrared sensor.

To overcome the abovementioned problems, the present invention provides an infrared sensor, so as to solve the afore-mentioned problems of the prior art.

SUMMARY OF THE INVENTION

One objective of the present invention is to provide an infrared sensor integrated with an infrared lens.

One objective of the present invention is to provide an infrared sensor for reducing packaging procedures.

One objective of the present invention is to provide an infrared sensor for reducing cost and volume.

According to an embodiment of the present invention, an infrared sensor includes a substrate, an infrared sensing chip, a metal cover, and an infrared lens. The infrared sensing chip is fixed to the substrate. The metal cover, fixed to the substrate, has an opening. The infrared lens, fixed to the metal cover, covers the opening. The substrate, the metal cover, and the infrared lens form a vacuum chamber. The infrared sensing chip is arranged in the vacuum chamber. The infrared sensor further includes a getter arranged within the vacuum chamber and configured to maintain the vacuum pressure of the vacuum chamber. The infrared lens has an infrared filtering function and a focusing function. Thus, an infrared filter may be omitted to reduce the cost and volume of the infrared sensor. The temperature generated by a fact that the metal cover is soldered to the substrate can activate the getter. As a result, the infrared sensor of the present invention can simplify the packaging process without performing an activation procedure.

According to an embodiment of the present invention, an infrared sensor includes a substrate, an infrared sensing chip, and an infrared lens. The substrate has a ring-shaped protruding portion. The ring-shaped protruding portion forms a vacuum chamber and the vacuum chamber has an opening. The infrared sensing chip is fixed to the substrate and arranged within the vacuum chamber. The infrared lens, fixed to the ring-shaped protruding portion, covers the opening. The infrared lens has an infrared filtering function and a focusing function. Thus, an infrared filter may be omitted to reduce cost and volume.

Below, the embodiments are described in detail in cooperation with the drawings to make easily understood the technical contents, characteristics and accomplishments of the present invention.

DETAILED DESCRIPTION OF THE INVENTION

Figure 1:
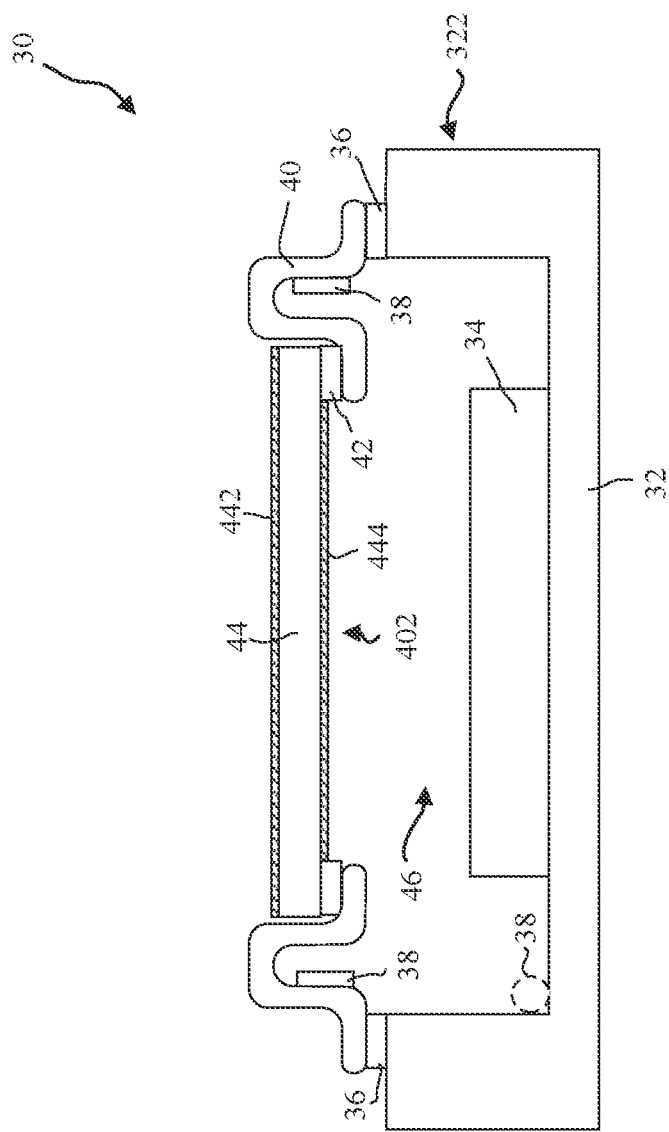
FIG. 1 is a cross-sectional view of an infrared sensor according to a first embodiment of the present invention.

FIG. 1 is a cross-sectional view of an infrared sensor according to a first embodiment of the present invention. An infrared sensor 30 includes a substrate 32, an infrared sensing chip 34, a solder sheet 36, a getter 38, a metal cover 40, a solder sheet 42, and an infrared lens 44. The substrate 32 may be, but not limited to, a ceramic substrate or a metal substrate. In the embodiment of FIG. 1, the substrate 32 is a leadless chip carrier (LCC), but the present invention is not limited thereto. The substrate 32 has a ring-shaped protruding portion 322. The infrared sensing chip 34 is fixed to the substrate 32 and surrounded by the ring-shaped protruding portion 322. The infrared sensing chip 34 is configured to sense infrared light to generate sensing pictures. The solder sheet 36 is arranged between the ring-shaped protruding portion 322 and the metal cover 40. The solder sheet 36 fixes the metal cover 40 to the ring-shaped protruding portion 322 of the substrate 32. The solder sheet 42 is arranged between the metal cover 40 and the infrared lens 44. The solder sheet 42 fixes the infrared lens 44 to the metal cover 40. The present invention is not limited to the solder sheets 36 and 42. In other embodiments, the solder sheets 36 and 42 can be replaced with other materials. The metal cover 40 has an opening 402. The infrared lens 44 covers and seals the opening 402. The infrared lens 44 has an infrared filtering function that allows only infrared light to pass. The infrared light is projected on the infrared sensing chip 34 through the infrared lens 44 and the opening 402. The infrared sensing chip 34 senses infrared light to generate pictures.

In an embodiment, the infrared lens 44 can use its layers to perform an infrared filtering function, but the present invention is not limited thereto. The infrared lens 44 also has a focusing function that focuses infrared light to the infrared sensing chip 34 to generate clear pictures. In order to avoid reflecting infrared light and degrading the quality of pictures, the infrared lens 44 can be coated or plated with anti-reflection layers 442 and 444. In the embodiment of FIG. 1, the top and the bottom of the infrared lens 44 are respectively provided with the anti-reflection layers 442 and 444, but the present invention is not limited thereto. In other embodiments, one of the anti-reflection layers 442 and 444 can be removed. In FIG. 1, the infrared lens 44 can be a planar lens, but the present invention is not limited to the planar lens. The other types of lenses can be used in the present invention, such as a convex lens, a convex-concave lens or a plano-convex lens. The substrate 32, the metal cover 40, and the infrared lens 44 form a vacuum chamber 46. The getter 38 is configured to maintain the vacuum pressure of the vacuum chamber 46, thereby increasing the service life of the infrared sensor 30. The getter 38 is not limited to being arranged on the metal cover 40. The getter 38 may be arranged at the other position of the vacuum chamber 46, as shown by a dashed line in FIG. 1. The getter 38 may be arranged on the substrate 32. In some applications, the infrared sensor 30 can omit the getter 38. In the infrared sensor 30 of the present invention, the infrared lens 44 has an infrared filtering function. Thus, the infrared filter of the infrared sensor can be omitted, thereby reducing cost and volume.

When the metal cover 40 is soldered to the substrate 32, the soldering temperature can activate the getter 38 on the metal cover 40. Thus, the infrared sensor 30 in FIG. 1 does not need to perform an activation procedure. Compared with the conventional infrared sensor, the infrared sensor 30 of the present invention can omit an activation procedure and thus simplify the packaging process.

Figure 2:
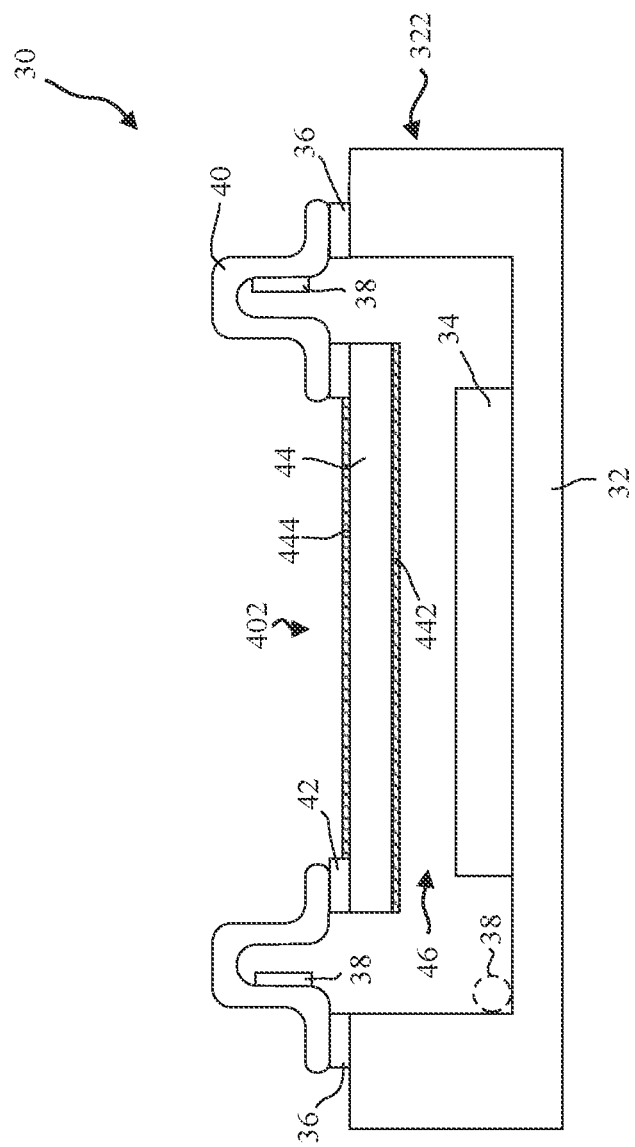
FIG. 2 is a cross-sectional view of an infrared sensor according to a second embodiment of the present invention.

FIG. 2 is a cross-sectional view of an infrared sensor according to a second embodiment of the present invention. Like FIG. 1, the infrared sensor 30 of FIG. 2 also includes the substrate 32, the infrared sensing chip 34, the solder sheet 36, the getter 38, the metal cover 40, the solder sheet 42, and the infrared lens 44. FIG. 2 is different form FIG. 1 in that the infrared lens 44 of FIG. 2 is fixed to the inside of the metal cover 40.

Figure 3:
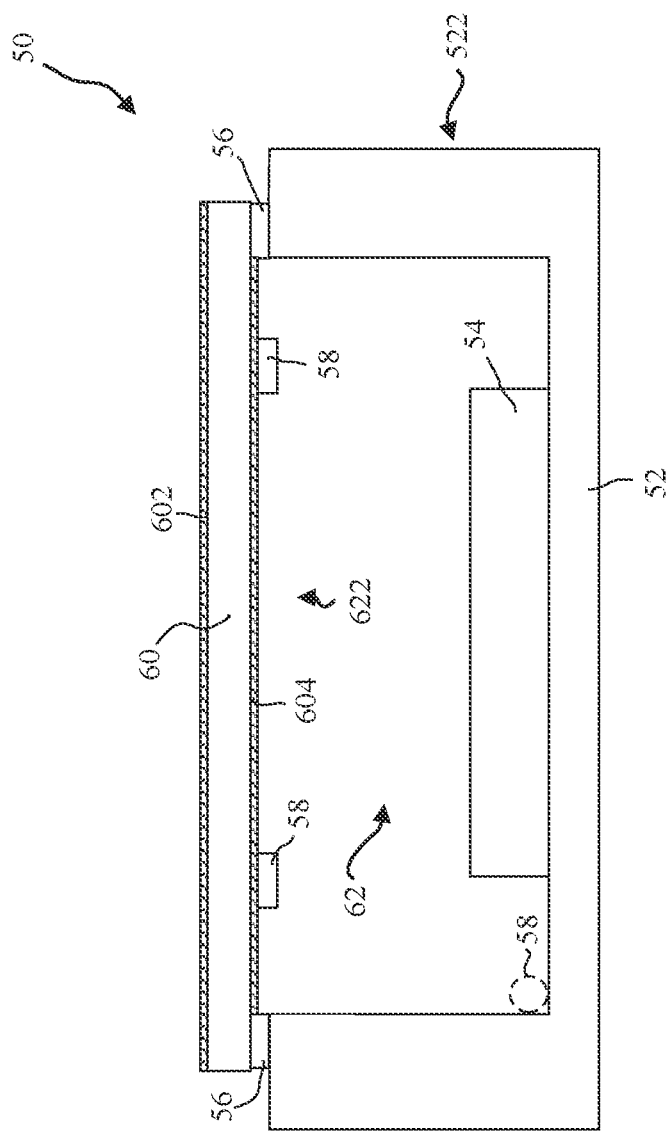
FIG. 3 is a cross-sectional view of an infrared sensor according to a third embodiment of the present invention.

FIG. 3 is a cross-sectional view of an infrared sensor according to a third embodiment of the present invention. An infrared sensor 50 includes a substrate 52, an infrared sensing chip 54, a solder sheet 56, a getter 58, and an infrared lens 60. The substrate 52 may be, but not limited to, a ceramic substrate or a metal substrate. In the embodiment of FIG. 3, the substrate 52 is a leadless chip carrier (LCC), but the present invention is not limited thereto. The substrate 52 has a ring-shaped protruding portion 522. The infrared sensing chip 54 is fixed to the substrate 52 and surrounded by the ring-shaped protruding portion 522. The infrared sensing chip 54 is configured to sense infrared light to generate sensing pictures. The solder sheet 56 is arranged between the ring-shaped protruding portion 522 and the infrared lens 60. The solder sheet 56 fixes the infrared lens 60 to the ring-shaped protruding portion 522 of the substrate 52. The present invention is not limited to the solder sheet 56. In other embodiments, the solder sheet 56 can be replaced with other materials. The ring-shaped protruding portion 522 forms a vacuum chamber 62. The vacuum chamber 62 has an opening 622. The infrared lens 60 covers and seals the opening 622. The infrared lens 60 has infrared filtering and focusing functions that focus infrared light to the infrared sensing chip 54 to generate clear pictures. The infrared lens 60 can be coated or plated with anti-reflection layers 602 and 604 lest infrared light be reflected by the infrared lens 60. In the embodiment of FIG. 3, the top and the bottom of the infrared lens 60 are respectively provided with the anti-reflection layers 602 and 604, but the present invention is not limited thereto. In other embodiments, the infrared lens 60 can be provided with the anti-reflection layers 602 or 604. In FIG. 3, the infrared lens 60 can be a planar lens, but the present invention is not limited to the planar lens. The other types of lenses can be used in the present invention, such as a convex lens, a convex-concave lens or a plano-convex lens. The getter 58 is arranged within the vacuum chamber 62 and attached or plated under the infrared lens 60. The getter 58 is configured to maintain the vacuum pressure of the vacuum chamber 62, thereby increasing the service life of the infrared sensor 50. The getter 58 is not limited to being arranged on the infrared lens 60. The getter 58 may be arranged at the other position of the vacuum chamber 62, as shown by a dashed line in FIG. 3. The getter 58 may be arranged on the substrate 52. In some applications, the infrared sensor 50 can omit the getter 58. In the infrared sensor 50 of the present invention, the infrared lens 60 has an infrared filtering function. Thus, the infrared filter of the infrared sensor can be omitted, thereby reducing cost and volume. The activation procedure of the getter 58 can refer to the existing technology. For example, an electric stimulation method is used for activation.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:
1. An infrared sensor comprising:
a substrate;
an infrared sensing chip fixed to the substrate;
a metal cover, fixed to the substrate, having an opening; and
an infrared lens, fixed to the metal cover, covering the opening;
wherein the substrate, the metal cover, and the infrared lens form a vacuum chamber;
wherein the infrared sensing chip is arranged in the vacuum chamber;
wherein a thickness of the infrared lens is less than a height of a space surrounded by the metal cover and arranged over the opening that communicates with the space and the infrared lens is arranged in the space;
wherein the infrared lens has an infrared filtering function and a focusing function;

wherein a top surface of the metal cover is higher than a top surface of the infrared lens and the metal cover has an inverted U-shape in cross section.

2. The infrared sensor according to claim 1, further comprising a getter arranged within the vacuum chamber and configured to maintain vacuum pressure of the vacuum chamber, wherein the getter is activated when the metal cover is soldered to the substrate.

3. The infrared sensor according to claim 1, wherein the substrate is a ceramic substrate or a metal substrate.

4. The infrared sensor according to claim 1, wherein the substrate is a leadless chip carrier (LCC).

5. The infrared sensor according to claim 1, wherein the infrared lens has an anti-reflection coating layer.

6. An infrared sensor comprising:
   a substrate having a ring-shaped protruding portion, wherein the ring-shaped protruding portion forms a vacuum chamber and the vacuum chamber has an opening;
   an infrared sensing chip fixed to the substrate and arranged within the vacuum chamber; and
   an infrared lens, fixed to the ring-shaped protruding portion, covering the opening;
   wherein a cross-sectional length of a bottom area of the vacuum chamber is less than a cross-sectional length of an area of the infrared lens;
   wherein the infrared lens has an infrared filtering function and a focusing function.

7. The infrared sensor according to claim 6, wherein further comprising a getter arranged within the vacuum chamber and configured to maintain vacuum pressure of the vacuum chamber.

8. The infrared sensor according to claim 6, wherein the substrate is a ceramic substrate or a metal substrate.

9. The infrared sensor according to claim 6, wherein the substrate is a leadless chip carrier (LCC).

10. The infrared sensor according to claim 6, wherein the infrared lens has an anti-reflection coating layer.

\* \* \* \* \*